United States Patent [19]

Handtmann et al.

[11] 4,134,293

[45] Jan. 16, 1979

[54] PRESSURE DIFFERENTIAL INDICATING APPARATUS FOR A HYDRAULIC MEASURING BRIDGE AND ITS ASSOCIATED MEASURING PISTON

[75] Inventors: Dieter Handtmann, Sindelfingen; Gotthold Raabe, Stuttgart-Fasanenhof, both of Fed. Rep. of Germany

[73] Assignee: Robert Bosch GmbH, Stuttgart, Fed. Rep. of Germany

[21] Appl. No.: 779,130

[22] Filed: Mar. 18, 1977

[30] Foreign Application Priority Data

Mar. 20, 1976 [DE] Fed. Rep. of Germany ....... 2611935

[51] Int. Cl.² .................... G01L 13/02; G01M 19/00
[52] U.S. Cl. ................................................... 73/168
[58] Field of Search ................. 73/168, 3, 119 A, 419, 73/398 R

[56] References Cited

U.S. PATENT DOCUMENTS

| | | | |
|---|---|---|---|
| 2,934,938 | 5/1960 | Rhoades | 73/3 |
| 3,271,994 | 9/1966 | Fournier et al. | 73/168 X |

Primary Examiner—James J. Gill
Attorney, Agent, or Firm—Edwin E. Greigg

[57] ABSTRACT

The invention relates to pressure differential indicating apparatus in a hydraulic measuring bridge which includes a measuring chamber that is provided with a valve means that emits a throughflow quantity into the chamber to be measured thereby and a further valve element for discharging the throughflow quantity from said chamber. The measuring chamber is associated with a pressure differential sensor having a movable wall which controls the volume of the measuring chamber and is acted upon by the pressure of a measuring medium that pulsates at slightly different pressures. Further, the pressure differential sensor is provided with a signal transmitter for controlling the measuring chamber volume and includes a cylinder having a wall provided with a piston means associated with a piston rod. The piston rod has one free end thereof arranged to cooperate with the signal transmitter and the piston means further includes a sealing means having an extent which cooperates with the cylinder wall to form an annular seal therebetween.

11 Claims, 5 Drawing Figures

PRESSURE DIFFERENTIAL INDICATING APPARATUS FOR A HYDRAULIC MEASURING BRIDGE AND ITS ASSOCIATED MEASURING PISTON

BACKGROUND OF THE INVENTION

The present invention relates to a pressure differential indicating apparatus and a measuring piston of a hydraulic bridge. More particularly, it relates to a throughflow quantity measuring apparatus having a measuring chamber positioned between a test object which emits the throughflow quantity to be measured to said chamber and therefrom to a throughflow quantity valve element, said measuring chamber being associated with a pressure differential sensor having a movable wall which controls the volume of the measuring chamber and is acted upon by the pressure of a measuring medium that pulsates at slightly different pressures, with said pressure differential sensor being provided with a signal transmitter for controlling the measuring chamber volume.

Hyraulic measuring bridges are designed to function on a comparison principle, wherein the throughflow quantity emitted by a test object is compared with the throughflow quantity emitted by a throughflow quantity valve element which serves as the standard. When this type of measuring bridge is used in a throughflow quantity measuring apparatus, the calibrated throughflow quantity valve element is readjusted until such time as the volume of the measuring chamber remains constant, that is until an equal throughflow quantity is conveyed by the throughflow quantity valve element and by the test object. When this hydraulic measuring bridge is used with a throughflow quantity measuring apparatus, the operation of the apparatus is reversed, that is, the throughflow quantity valve element is set to a fixed predetermined value and the test object is thereafter adjusted either by hand or automatically until such time as its throughflow quantity corresponds to the throughflow quantity of the throughflow quantity valve element and that point is reached when the measuring chamber volume remains constant. The precision and functional capability of such measuring instruments depends entirely on the precision and functional capability of the pressure differential sensor attached to the measuring chamber; thus the potentially present friction enters directly into the measured result and leakage losses likewise falsify the result.

A pressure differential indicating apparatus is known which features a so-called swimming measuring piston which acts as the movable wall and is of a type which is fitted into a measuring cylinder with a clearance of a few thousanths of a millimeter with the piston being set into motion by the measuring medium and without having any additional sealing means serves to indicate the volume changes or pressure changes through its optically measured position changes. Such a measuring piston has the disadvantage of reacting very sensitively to entrained particulate matter within the measuring medium and a direct articulation of a non-contacting electrical excursion sensor is thus not possible, so that the deployment of the appertaining pressure differential indicating apparatus remains largely restricted to laboratory operations and its usage in a mass production environment for throughflow quantity measuring or for throughflow quantity setting is as a result extremely difficult.

Also well-known in the prior art is a pressure differential indicating apparatus of a hydraulic measuring bridge of the type referred to above, wherein a throughflow control valve provided with two diaphragms serves as the pressure differential sensor and this throughflow control valve regulates the fluid stream for the propulsion of a hydraulic motor which drives a pump that serves as the throughflow quantity valve element. The revolutions per unit time of the hydraulic motor in such a device are readjusted until such time as the conveyance quantity of the hydraulic pump that serves as the throughflow quantity valve element equals the conveyance quantity of the test object. In this exclusively hydraulic-mechanical apparatus, the double diaphragm works relatively satisfactorily only near its null position. However, during extreme deflections an amplified friction appears, the magnitude of which can become uncontrollably high and can thus not be compensated for by a corresponding calibration of the instrument. Such an apparatus cannot follow rapid and larger volume changes, and is therefore not suitable in most cases of application.

OBJECT AND SUMMARY OF THE INVENTION

Accordingly, it is the primary object of the present invention to improve a pressure differential indicating apparatus of a hydraulic measuring bridge for the deployment in throughflow quantity measuring apparatuses or throughflow quantity setting apparatuses to such an extent, that the above-cited disadvantages of the well-known apparatuses do not occur and that the present apparatus can be usable for a rapid and precise measurement of the throughflow quantity in a mass production environment and further provides for a design wherein the excursion of a movable wall indicating the pressure differential shall be measured electrically and converted into a control signal for controlling volume in a measuring chamber.

This objective is achieved according to the invention by an arrangement wherein a double-acting measuring piston serves as a wall that is guided and axially movable within a measuring cylinder. This wall is supported upon a piston rod that is provided with an elastic double-lipped seal, the two confronting sealing lips of which are mirror images of each other and oriented to point toward each other. The sealing lips embrace a disk plate element and are bent toward the longitudinal axis of the measuring piston and form together with the radial surface of the wall of the measuring cylinder an annular sealing chamber. This double-acting piston is provided with an elastic double-lipped seal and is practically leak-free when a thrust is placed on both sides thereof by a measuring medium pressure whose average value is substantially equal and which pulsates with slightly different pressures. Pistons having a double-lipped seal constructed in this manner are in themselves familiar, and are commonly employed only where a very large pressure differential prevails on both sides of the piston. The pressure built up with these seals within the annular sealing chamber formed by mirror image sealing lips that are oriented toward each other presses the sealing lips firmly against the cylinder wall and thereby creates an extremely good seal admittedly with a concurrently increased frictional resistance. It has been expressly emphasized in many cases that such a sealing chamber pressure will lead to a jamming effect, so that a utilization of this apparatus in measuring systems was found to be impractical.

An especially advantageous and preferred embodiment of the measuring piston for the apparatus, according to the invention, resides in the fact that each of the disk plates that are utilized is constructed of a foil-like material at least in the region of the sealing lips. As a result therefrom practically no intrinsic forces develop at the sealing lip and a seal constructed in this manner has proven to be highly successful.

It is a further object of this invention and has been shown to be especially advantageous that the sealing lips of the disk plate are approximately 0.1 millimeter — preferably between 0.05 and 0.2 millimeter — thick, and a simple and precise fabrication of the sealing lips is accomplished by providing that the foil-like sealing lip is of the same thickness throughout its entire extent and up to the sealing edge.

A still further particularly advantageous embodiment of the measuring piston, according to the invention, is provided by the disk plates being secured between attachment flanges with each disk plate comprising a foil that is only approximately 0.1 millimeter — preferably between 0.05 and 0.2 millimeter — thick.

Yet another object of this invention is to produce the disk plates of a material having an extremely low coefficient of friction, preferably of polytetrafluoroethylene (PTFE), since they are simple to manufacture on a large scale and the presence of friction from such a disk is reduced to a negligible value.

Other objects and advantages of the present invention will be more readily apparent from a further consideration of the following detailed description of the drawings illustrating two preferred embodiments of the invention, in which:

DESCRIPTION OF THE PREFERRED EMBODIMENTS

Figure 1:
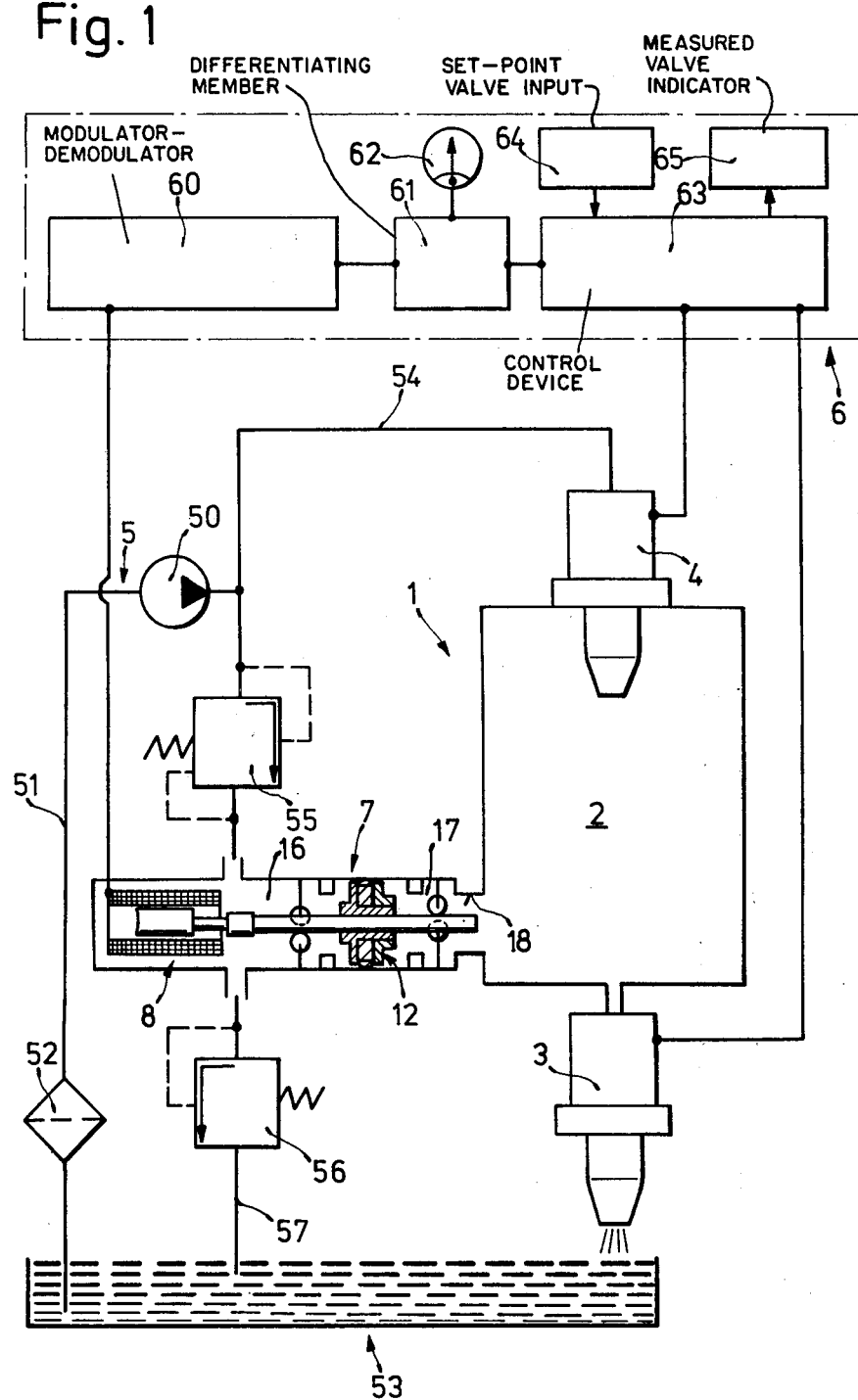
FIG. 1 discloses diagrammatically a throughflow quantity measuring apparatus with a hydraulic measuring bridge wherein a pressure differential indicating apparatus is depicted in a simplified form.

Turning now to the drawings, the throughflow quantity measuring apparatus depicted in FIG. 1 includes as its most important component group a pressure indicating apparatus 1 of a hydraulic measuring bridge which functions on a comparison principle and the operation thereof is more fully explained hereinafter.

The apparatus 1 comprises a measuring chamber 2, a test object 3 attached to the measuring chamber, and a throughflow quantity valve element 4 which conducts the fuel that serves as the measuring medium. The fuel is conveyed from a pressure source 5, into the measuring chamber 2 by the throughflow quantity element 9. The test object 3, and the throughflow quantity element 4 that serves as the standard for the hydraulic measuring bridge are, as disclosed hereinafter, magnetic injection valves of identical construction, which have the advantage that their hydraulic behavior is practically the same thereby eliminating system errors. Such a construction thereby substantially increases the precision of the throughflow quantity measurement and simplifies the usage of the apparatus. Both magnetic valves 3 and 4 are controlled by means of an electrical control circuit 6 which is, together with the pressure source 5, described in greater detail hereinbelow.

Figure 3:
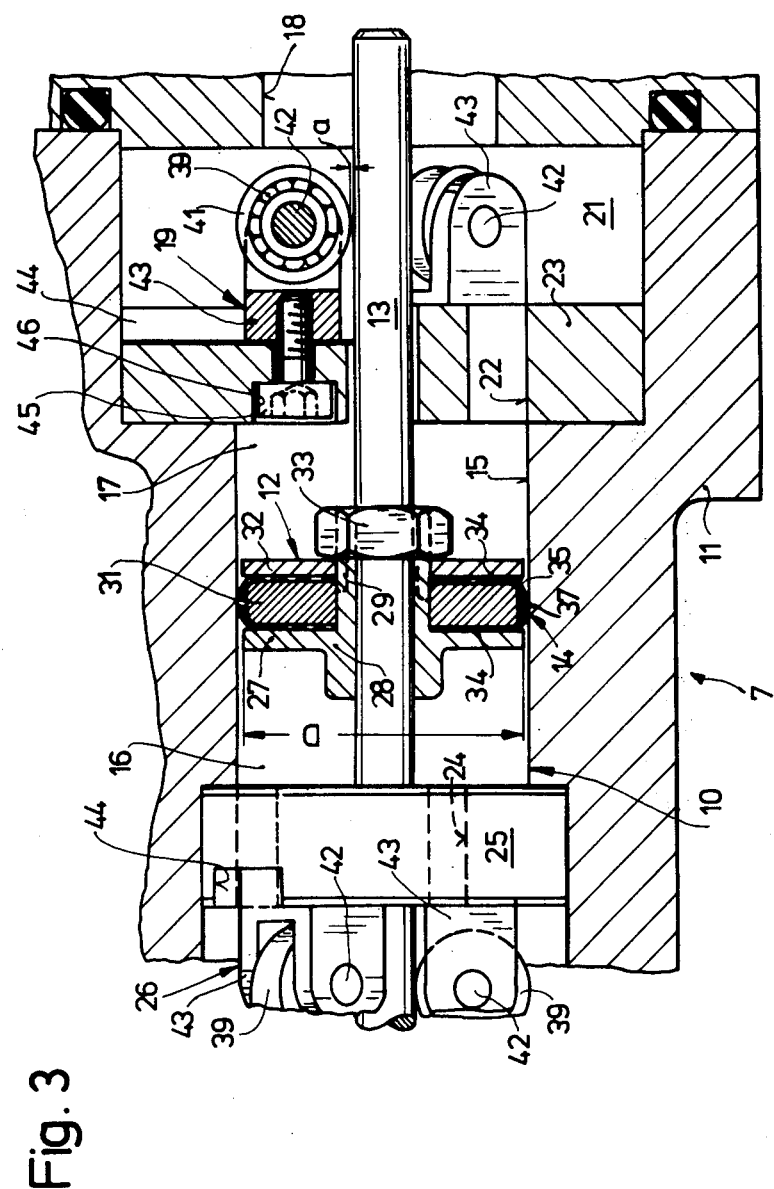
FIG. 3 is a partial cross-sectional view of the measuring piston disclosed in this application on an enlarged scale.
Figure 4:
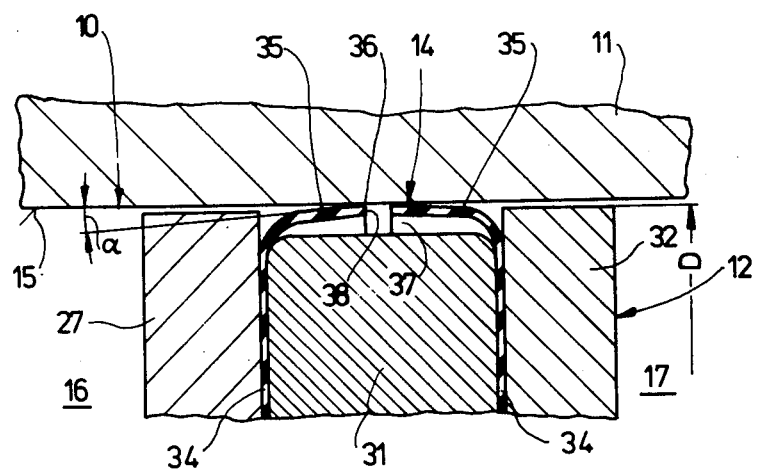
FIG. 4 is a partial cross-sectional view in greater detail of the structure from FIG. 3 in the region of the sealing lips on a still larger scale.

Attached to the measuring chamber 2 is a pressure differential sensor 7, which includes a measuring piston 12 and an inductive excursion sensor 8 which serves as the signal transmitter means for the given position of the measuring piston 12, all of which is revealed in greater detail in the application of Raabe, Ser. No. 779,200 which is assigned to the assignee of this application. The measuring piston 12 serves as the movable wall for the bounding of the given volume extant within the measuring chamber 2 with the entire mechanism being constructed in such a manner that the oppositely disposed surfaces of the measuring piston 12 are acted upon by a fuel pressure, the average value of which is substantially the same and which pulsates at slightly different pressures. Further details of the measuring piston 12 are shown in FIGS. 3 and 4 and described and elucidated upon in this application as well as in Ser. No. 779,200, filed Mar. 18, 1977.

Figure 2:
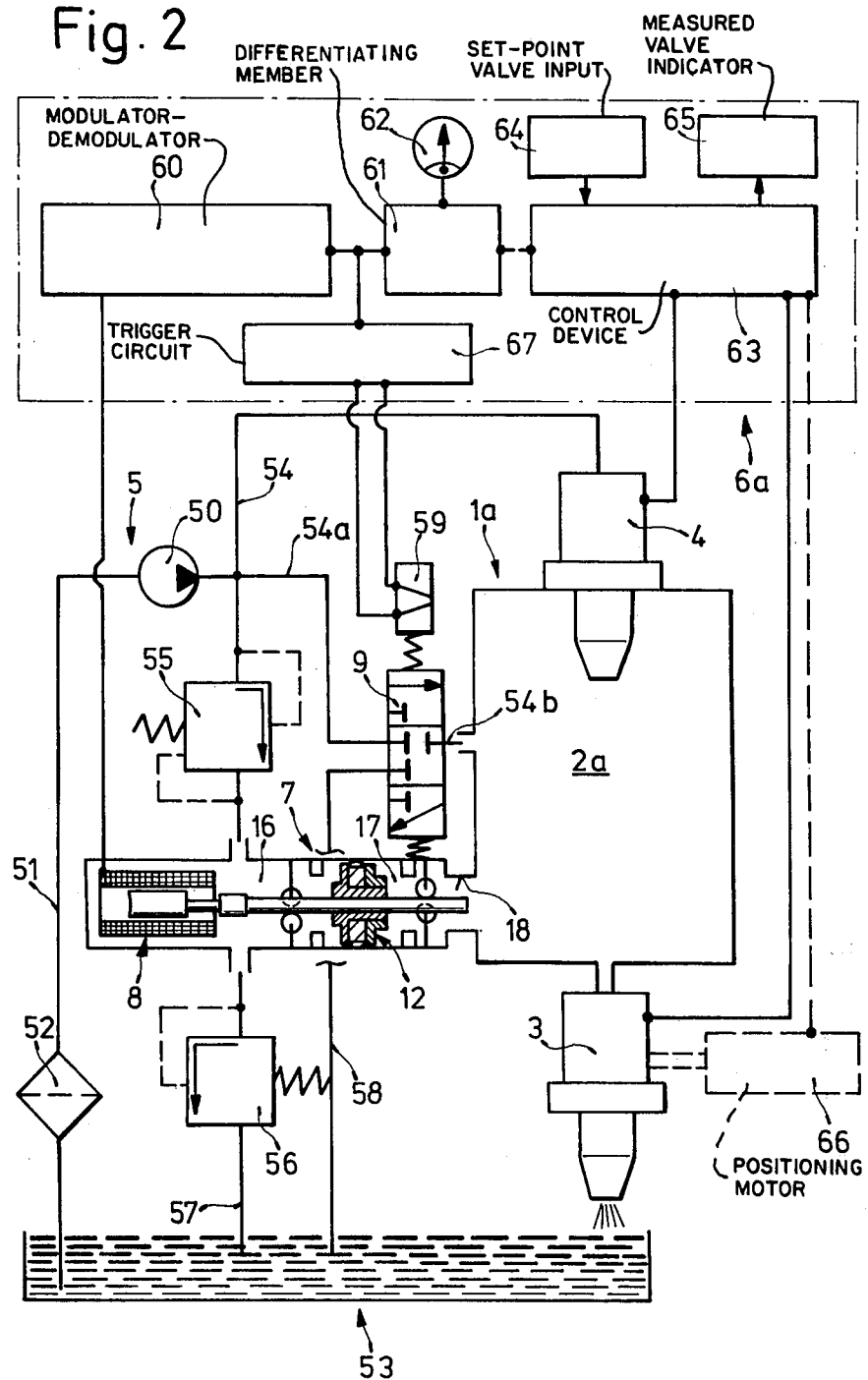
FIG. 2 discloses diagrammatically another embodiment of the invention of a throughflow quantity setting apparatus with the pressure differential indicating apparatus depicted in a simplified form.

The throughflow quantity measuring apparatus depicted in FIG. 2 is constructed substantially the same as the throughflow quantity measuring apparatus of FIG. 1, and the same respective parts thereof have been provided with the same reference numerals. Thus, the throughflow quantity measuring apparatus of FIG. 2 contains a pressure differential indicating apparatus 1a, which essentially consists, as does the corresponding apparatus 1 in FIG. 1, of a measuring chamber 2a to which are attached the magnetic valves 3 and 4, respectively. These valves serve as the test object and as the throughflow quantity valve element. The pressure differential sensor 7 comprises the measuring piston 12 and the signal transmitter 8. However, in the structure disclosed in FIG. 2, a control valve 9 constructed as an electromagnetically actuated three-way valve is additionally attached to the measuring chamber 2a, and the control valve 9 is connected — as is the throughflow quantity valve element 4 — with the pressure source 5. The control valve 9 serves for the automatic maintenance of the volume extant within the measuring chamber 2a, particularly when the magnetic valve 3 serving as the test object does not convey the same throughflow quantity as does the fixedly adjusted magnetic valve 4 which serves as the standard. The control valve 9 always goes into action when the measuring piston 12 has moved a predetermined distance away from its central position. The control valve 9 as well as the measuring piston 12 remain in the rest position illustrated whenever the setting of the magnetic valve 3 effectively equals that of the magnetic valve 4, which conveys the reference throughflow quantity. Both magnetic valves 3 and 4 and the control valve 9 are actuated by means of an electrical control circuit 6a the construction of which, as well as that of the pressure source 5, is more fully explained herein below.

Turning at this time to FIGS. 3 and 4, the measuring piston 12 which is utilized for both exemplary embodiments of this invention according to FIGS. 1 and 2, is now described in greater detail.

The double-acting piston 12 that serves as the measuring piston is attached to a piston rod 13 and is provided with an elastic double-lipped opposed sealing member 14, and is guided in a cylinder 10 (see FIG. 3) of an only partially depicted housing 11 of the pressure differential sensor 7. This double-lipped sealing member 14, further depicted in FIG. 4 and described more fully further below, cooperates with the contact surface, designated 15, of the cylinder 10. The piston 12 divides the cylinder 10 into two chambers 16 and 17. These two chambers are sealed from one another by means of the double-lipped sealing member 14, and are exposed to a fluid pressure pulsating at slightly different pressures, with the average value of these pressurizing being substantially the same in both chambers. Thus the right chamber 17 communicates with several passage borings 22 uniformly distributed on the circumference of a bearing plate 23 of the bearing 19 and with a chamber 21 which in turn communicates with the measuring chamber 2 (see also FIGS. 1 and 2) that contains the fuel which serves as the pressure fluid. The fuel provided within the left chamber 16 and conducted thereto via borings 24 in a bearing plate 25 of a second bearing 26 that supports the other end of the piston rod 13, is adjusted to that pressure — as explained more fully in the description of the pressure source 5 for the apparatus according to FIG. 1, respectively FIG. 2, hereinafter — which prevails in the stabilized condition within the measuring chamber 2.

The piston 12 is constructed of several disk-shaped parts and includes a carrier component 28 provided with an integral or first abutment surface or flange 27 with the carrier component 28 further including a threaded shank portion 29 which supports a disk-like member 31 and another or second flange 32, all of which are retained in an assembled position by means of a nut 33. As is shown further in FIGS. 3 and 4, thin disk-like elements 34—34 which comprise a foil that is approximately 0.1 millimeter, or preferably between 0.05 and 0.2 millimeter thick, of a sealing material and which have an extremely low coefficient or friction are securely fastened about the disk member 21 and held securely to flanges 27 and 32 by the nut 33. Each of the disk plates 34-34 that are pressed securely against the disk-like member 31 by means of the flanges 27 and 32 further include confronting cup-shaped surfaces 35—35 (see in particular FIG. 4) that extend longitudinally of the piston 12 that is carried by the piston rod 13. The foil-like material of the disk plates 34—34 is of the same thickness throughout, i.e., up to and including the sealing edge 36 of the cup-shaped surfaces 35—35. Thus, as shown, the two disk plates 34—34 are assembled in mirror symmetry with mutually facing sealing lips 35—35 which form, together with the contact surface 15 of the cylinder 10 and with the outer skirt surface of the disk-like member 31, an annular sealing chamber 37. The two sealing lips 35—35 that form the elastic double-lipped seal 14 are inclined at an extremely acute angle α (see FIG. 4) toward the contact surface 15 of the cylinder 10, so that due to the cup-shaped configuration of the disk plates 34—34 the foil-like edge that forms the sealing lips 35—35 are correspondingly stiffened, and do not cock open or buckle at the prevailing slightly different pressures. To assure an efficient seal, only one sealing edge designated 36 must ever cooperate with the contact surface 15, that is, the angle α must not become zero. Very good results are achieved with an angle α of approximately 5 degrees to 10 degrees, wherein the outer edge of the skirt face surface 3B of the disk-like elements 34—34 serves as the sealing edge 36. The skirt face surface 38 is advantageously produced not in the planar, but rather in the deformed or cup-shaped state of the disk-like elements 34—34 by means of the cutting of the rim thereof, which makes the sealing edge 36 satisfactorily smooth. Barely measurable friction values are achieved with disk plates 34—34 that are manufactured, that is, are pressed into the cup-shaped form by a suitable tool and subsequently cut, from 0.07 millimeter thick foil of polytetrafluoroethylene (PTFE).

The disk-like elements 34—34 can, of course, possess any other desired form and thickness, especially when mass-produced, it only being required that the region of the sealing lips 35—35 be constructed foil-like, since at greater material strength friction is created through intrinsic strain, and the performance of the double-lipped seal then merely equals that of the familiar lipped seal and would therefore not be applicable to measuring instrument pistons.

Although a certain degree of stiffness of form is obtained by means of the depicted shape of the sealing lips 35—35, the outer diameters D of the attachment flanges 27 and 32 remote from the sealing chamber 37 are constructed to extend almost to the contact surface 15 of the cylinder 10, in order to prevent the damaging of the sealing lips 35—35 during abnormal or sudden pressure peaks. Further, as shown in FIG. 4, the clearance between the skirt surfaces of the attachment flanges 27 and 32 as defined by the bounding outer diameter D and the contact surface 15 measures just large enough that neither of the attachment flanges 27 and 32 rub against the contact surface 15 during the longitudinal movement of the piston 12.

The two bearings 19 and 26 (see now FIG. 3) each comprise three ball bearing assemblies arranged in a star-like manner around the axis of the piston rod 13 with the outer races 41 of these bearings being arranged to lie without pressure at three points adjacent to the periphery of the piston rod 13, and are therefore mounted with some clearance so that a slight clearance "a" of a few hundreths of a millimeter up to approximately 0.1 millimeter is produced at the given bearing or bearings 39 relieved of any load in the assembled state. The pin-shaped axles, designated 42, of the ball bearings 39 are pressed into the bearing supports 43, each of which are in turn set into the radial grooves 44 of the bearing plates 23 and 25, and are thereafter secured by the screws 45. The radial grooves 44 and the diametric clearance between the screws 45 and the shouldered borings 46 in the bearing plates 23 and 25 that receive the screws 45 provide the functionally necessary adjustment of the ball bearings relative to the position of the piston rod 13, so that the clearance "a" can be set. The one bearing assembly 19 comprising the three ball bearings 39 is rotationally offset during assembly by 60 degrees relative to the other bearing assembly 26 which likewise comprises the three ball bearings 39, so that in the fully assembled relationship of these bearing assemblies as shown in FIG. 3, one of the bearing assemblies 19 is adjacent to the top of shaft 13 and the other bearing assembly 26 includes one ball bearing which is adjacent to the bottom of the shaft 13. Thus, during a unilateral and eccentric loading of the piston rod 13 by the measurement source, only one ball bearing will receive in each case the pressure forces transmitted by the piston rod 13, whereas the other two bearings then serve solely for a locational purpose. A similar and extremely low friction in the bearing arrangement is also produced when instead of the one bearing, two bearings receive the pressure forces during a unilateral loading of the piston rod 13.

Referring at this time to FIGS. 1 and 2, the pressure source 5 that is used with both exemplary embodiments of the invention essentially comprise a suitable fuel transport pump 50, which lifts fuel by means of suction line 51 via a filter 52 from a tank 53, and then conveys the fuel via a pressure line 54 to the magnetic valve 4 which serves as the throughflow quantity valve element. First and second pressure control valves 55 and 56 are additionally connected to the pressure line 54, with the first valve 55 being a pressure attenuation valve which reduces the pressure prevailing in the pressure line 54 by a fixed amount that corresponds to the given intrinsic pressure difference at the magnetic valves 3 and 4; and the second valve being a pressure limiting valve 56 which limits the pressure prevailing in the chamber 16 of the pressure differential sensor 7. Accordingly, excess fuel is returned to the tank 53 via a return line 57. In the exemplary embodiments according to FIGS. 1 and 2, the operation of the valves 55 and 56 is as follows:

OPERATION

The pressure limiting valve 56 limits the pressure in the chamber 16 to 2 atmospheres, and the pressure attentuation valve 55 effects the prevalence of 4 atmospheres in the pressure line 54 at a set pressure difference of 2 atmospheres. The pressure difference controlled by the pressure attenuation valve 55 is thus made equal to the pressure difference at the valve 56, and 2 atmospheres likewise prevail, as in the chamber 16, in the measuring chamber 2 and in the chamber 17 of the pressure differential sensor 7 that is connected to the measuring chamber 2 via the boring 18, since the piston 12 is interposed as a pressure-transmitting movable wall between the two chambers 16 and 17. A pressure whose average value is equal always prevails in the two chambers, since the piston 12 works practically without friction, which is of decisive significance in the functioning of the apparatus.

In the second exemplary embodiment of the invention, according to FIG. 2, the fluid pressure present in the pressure line 54 is additionally conducted to the inlet of the control valve 9 via the branch line 54a, with the control valve 9 being connected to the measuring chamber 2a via a further branch line 54b. The measuring chamber 2a can be connected with the tank 53 via a second return line 58. In the drawing of FIG. 2 the control valve 9 is constructed as a three-way valve, and all of the lines 54a, 54b and 58 are shown blocked. In another operative relation controlled by a double-acting magnet 59 of the control valve 9, the lines 54a and 54b are connected with the measuring chamber 2a, so that fuel is conducted thereto. In a still further operative relation of the control valve 9, the lines 54b and 58 are connected to each other, so that fuel can then flow out of the measuring chamber 2a.

The electrical regulating circuit 6 of the throughflow quantity measuring apparatus according to FIG. 1 and the electrical control circuit 6a of the throughflow quantity measuring apparatus, according to FIG. 2, have the following components in common: A modulator-demodulator 60 processing the excursion signal of the inductive excursion sensor 8 into a velocity signal and possessing a velocity indicator 62, a control device 63 for the magnetic valves 3 and 4, and a set-point value input 64 as well as a measured value indicator 65.

In the regulating circuit 6 according to FIG. 1, the circuit components 60, 61 and 63 are connected to one another, and the velocity indicator 62 can be omitted in a fully automatic system.

In the electrical control circuit 6a according to FIG. 2, no connection is present between the differentiating member 61 and the control device 63 when the adjustment of the test object 3 is effected manually. The velocity indicator 62 displays to the adjustor the movements of the piston 12 which cease when, by means of the adjustment of a setting device of the test object 3, the throughflow of the test object 3 equals that of the throughflow quantity valve element 4. In that event, the impulse durations for the magnetic valves 3 and 4 are inserted from the set value input 64, and the indicator 65 could then be omitted or, on the one hand, show the actual value of the given set impulses or, on the other hand, show the throughflow quantity adjusted and conveyed at the throughflow quantity valve element 4. When the adjustment of the magnetic valve 3 is fully automatic, a positioning motor 66 represented by dashed lines is controlled from the control device 63, and the velocity signal of the differentiator 61 is then likewise inserted into the control device 63, as indicated by the dashed line. When the control piston 12 deviates by a specific amount from a central location, the double-acting magnet of the control valve 9 is actuated by means of a trigger circuit 67 that is connected to the junction containing the excursion signal of the excursion transmitter 8, i.e., between the modulator-demodulator 60 and the differentiator 61.

Figure 5:
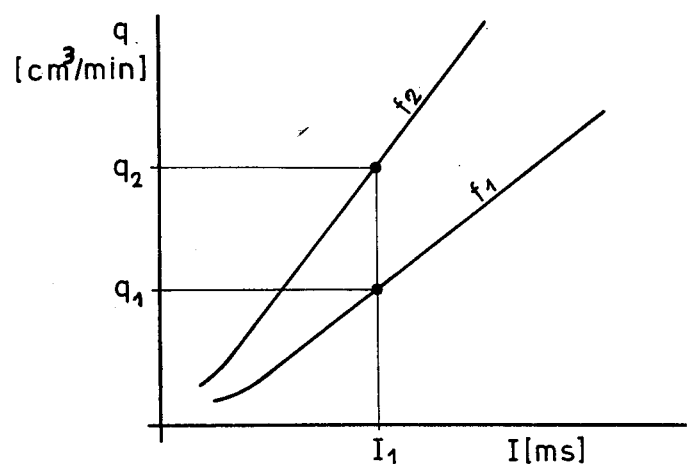
FIG. 5 is a diagram to illustrate the function of the apparatus according to the invention of FIGS. 1 and 2.

The diagram of FIG. 5 shows two curves which represent the throughflow q in cubic centimeters/minute versus the impulse length I in milliseconds, for an apportioning magnetic valve, wherein the frequency f serves as the parameter, so that curves of differing angles are formed for the frequency f1 and f2. At a given constant impulse length I1, the magnetic valve conveys, for example, a throughflow quantity q1 at the frequency f1 and q2 at the frequency f2. These curves, which are obtained during a calibration of the throughflow quantity valve element, serve as a basic reference both in the measuring of the throughflow quantity as well as in the measuring of the throughflow quantity of the test object. The function of the two apparatuses according to FIGS. 1 and 2 is now briefly described, with particular consideration being given to the operation of the pressure differential indicating apparatus 7.

The magnetic valves 3 and 4 respectively, which serve as the test object and as the throughflow quantity valve element which is attached to the measuring chamber 2 are only described by way of example; other devices, whose throughflow is to be set or measured, can also be installed. The apparatuses according to FIGS. 1 and 2 are preferably usable with those products that have a fixed pressure differential between the inlet and the outlet.

In the throughflow quantity measuring apparatus according to FIG. 1, the impulse length for the magnetic valves 3 and 4 which as already described relative to FIG. 5, corresponds in the throughflow quantity valve element 4 to a fixed and calibrated throughflow, is inserted via the set value input 64. When the fuel quantity conveyed by the magnetic valve 4 into the measuring chamber 2 does not equal the quantity removed by the magnetic valve 3, then the piston 12 executes a deviation movement which is converted to a velocity signal by means of the signal transmitter 8, the modulator-demodulator 60, and the differentiator 61. Accordingly, this velocity signal causes a correction in the control device 63 of the signal controlling the throughflow quantity valve element 4 until the piston 12 no longer undergoes any movement. The measured throughflow quantity, preferably displayed in digital form, can then be read directly on the measured value indicator 65.

In the throughflow quantity measuring apparatus according to FIG. 2, either a fixed adjustment magnetic valve 4 is attached to the measuring chamber 2a, or the magnetic valve 4 that serves as the throughflow quantity element is controlled through the set value input 64 by means of the control device 63 in accordance with a throughflow quantity to be set at the test object 3, through correspondingly sized impulses I. The same impulses I are conducted from the control device 63 to the magnetic valve 3 that serves as the test object, and, so long as a throughflow quantity differential appears the volume of the measuring chamber 2a changes and this fact is transmitted as an excursion signal to the modulator-demodulator 60 as a result of the movements of the measuring piston 12 and of the signal transmitter 8. The excursion signal is then converted in the differentiator 61 to a velocity signal and is displayed at the velocity indicator 62. The adjustor controls the setting of the test object on the basis of this velocity indication until the velocity indicator 62 displays zero, at which time the setting of the magnetic valve 3 that serves as the test object is correct. If the volumetric deviation in the measuring chamber 2a is so large that the measuring piston 12 reaches the proximity of one of its end positions, then the control valve 9 is automatically actuated by means of the trigger circuit 67 as previously described, so that the measuring piston 12 is led back to its central location.

A fully automatic setting of the test object 3 can take place through the setting of the magnetic valve 3 that serves as the best object by means of the positioning motor 66 which is controlled by the control device 63.

The measuring piston 12 depicted in FIGS. 1 to 4 and serving to indicate volumetric changes in the measuring chamber 2 and 2a is so constructed that its own friction is negligibly low, and that only extremely small and barely measurable leakage losses can occur. This is achieved due to the fact that in both chambers 16 and 17 a fluid pressure whose average value is substantially the same, and which pulsates at only slightly different pressures, is arranged to act upon the piston 12. If, for example, the volume increases in chamber 17, shown to the right in the drawing, is connected with either of the measuring chambers 2 or 2a, then the piston 12 moves in a direction toward the chamber 16 due to its characteristic low friction, whereupon the pressurized fluid enters the sealing chamber 37 (see particularly FIGS. 3 and 4) along the sealing lip 35 of the right disk plate 34 mounted facing toward the chamber 16, due to the slight pressure differential between the two chambers 16 and 17, thereby pressing the sealing lip 35 of the disk-like element shown at the left in the drawing which faces toward the chamber 17 against the contact surface 15, thereby preventing any leakage.

The foil-like construction of the sealing lip 35, together with the choice of a sealing material of low friction, and the rapid withdrawal, practically without frictional resistance, of the piston 12 prevents a pressure rise in the sealing chamber 37 to a pressure magnitude which would lead to increased intrinsic friction of the piston-cylinder unit. Since in its function as a measuring piston the piston 12 executes only small strokes in either direction, and since pressures whose average values are substantially the same prevail in both chambers 16 and 17, practically no leakage quantity can ever occur. The piston 12 is arranged to seal at the slightest intrinsic friction and is, moreover, capable of passing any minute particulate matter that may be entrained in the fluid in spite of its having been filtered. Accordingly, such dirt particles can neither lead to the jamming of the piston nor to the destruction or temporary interruption of the sealing effect of the double-lipped seal 14. By means of the mutually facing disposition of the sealing lips 35—35, as explained earlier, a slow decay of the sealing pressure takes place in the sealing chamber 37 after momentary pressure peaks, so that the friction trails large and small pressure differences dynamically. Since the pressure peaks may appear alternately in the chambers 16 or 17, the leakage quantities are decreased by an order of magnitude relative to other well known sealing means, whereas the frictional force is only raised imperceptibly. The utilization of PTFE with its extremely low friction factor prevents a seizing of the piston 12 both in the stationary as well as in the moving state.

The piston 12, disclosed as an important part of this invention, has proven itself particularly suitable at pressures to 10 atmospheres, where admittedly pressure differences of $<0.1$ atmospheres occurred during normal operation. Pressure peaks of $\approx 3$ atmospheres and greater do not impair the durability of the piston, due to the previously described design of the sealing lips 35—35 and the support provided therefor by the disk member 31 and flanges 27 and 32.

Since the function and the durability of the piston seal depend primarily upon the occurrence of slightly different pressures and less upon the operational pressure on both sides of the piston 12, this piston can also be employed in installations with far higher pressures.

In the described exemplary embodiment of the invention according to FIGS. 1 and 2, a magnetic valve, and more specifically magnetic injection valves 3 and 4, was used in each case as the throughflow quantity valve element and as the test object. The invention does not, however, restrict itself in any way to the use of magnetic valves; other valves or apportioning devices, especially those featuring a given pressure differential between the inlet and the outlet. Furthermore, pumps or other fluid conveying units, can also be incorporated into the described hydraulic measuring bridge. The pressure differential can also be zero, for example with pumps, so that the pressure attenuation valve 55 that is provided between the pressure line 54 and the chamber 16 of the pressure differential sensor 7 could then be omitted (FIGS. 1 and 2).

What is claimed is:

1. Pressure differential responsive apparatus in a hydraulic measuring bridge including a measuring chamber that is provided with a standard valve means which emits a known throughflow quantity into said chamber and a further valve means being tested for discharging the throughflow quantity from said chamber to be measured thereby, said measuring chamber being associated with a pressure differential sensor having a movable wall one side of which is in communication with said chamber and the other side of which is exposed to a controlled pressure, said pressure differential sensor being provided with a signal transmitter responsive to movement of the movable wall for controlling the flow through the measuring chamber by adjusting one of said valve means, means for indicating the adjustment of said valve means, further characterized by said pressure differential sensor including a cylinder having a wall and further provided with a piston means associated with a piston rod, said piston rod having one free end thereof arranged to cooperate with said signal transmitter and said piston means further including confronting sealing means having an extent which cooperates with said cylinder wall to form an annular seal therebetween.

2. Pressure differential indicating apparatus as defined by claim 1, in which said confronting sealing means comprise mirror image foil-like sealing lip portions extending toward one another.

3. Pressure differential indicating apparatus as defined by claim 2, in which said sealing lip portions are preferably between 0.05 to 0.2 millimeter thick.

4. Pressure differential indicating apparatus as defined by claim 2, in which said sealing lip portions include a skirt area inclined at an extremely acute angle ($\alpha$) relative to said cylinder wall.

5. Pressure differential indicating apparatus as defined by claim 1, in which said confronting sealing means straddle a disk-like element and are retained thereagainst by flange means.

6. Pressure differential indicating apparatus as defined by claim 1, in which said sealing means comprise polytetrafluoroethylene.

7. Pressure differential indicating apparatus as defined by claim 1, in which said sealing means are of the same thickness throughout their entire extent.

8. Pressure differential indicating apparatus as defined by claim 1, in which said confronting sealing means are embraced by oppositely disposed flange means that terminate adjacent to said cylinder wall.

9. Pressure differential indicating apparatus as defined by claim 1, in which said piston rod has oppositely extending portions each of which are arranged to extend through a path surrounded by plural bearing means.

10. Pressure differential indicating apparatus as defined by claim 9, in which said bearing means include axle portions that extend perpendicular to said piston rod.

11. Pressure differential indicating apparatus as defined by claim 9, in which each of said plural bearing means disposed about the opposite end portions of said piston rod are rotated 60 degrees relative to each other.

* * * * *